(12) United States Patent
Tilly et al.

(10) Patent No.: US 7,676,421 B2
(45) Date of Patent: Mar. 9, 2010

(54) METHOD AND SYSTEM FOR PROVIDING AN AUTOMATED AUCTION FOR INTERNALIZATION AND COMPLEX ORDERS IN A HYBRID TRADING SYSTEM

(75) Inventors: Edward T. Tilly, Barrington, IL (US);
Anthony J. Carone, Chicago, IL (US);
Stuart J. Kipnes, Chicago, IL (US);
James Gazis, Westmont, IL (US);
Anthony Montesano, Chicago, IL (US);
Eileen C. Smith, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 1122 days.

(21) Appl. No.: 11/249,018

(22) Filed: Oct. 11, 2005

(65) Prior Publication Data

US 2006/0106713 A1 May 18, 2006

Related U.S. Application Data

(63) Continuation-in-part of application No. 10/423,201, filed on Apr. 24, 2003.

(60) Provisional application No. 60/632,726, filed on Oct. 1, 2004.

(51) Int. Cl.
*G06Q 99/00* (2006.01)
(52) U.S. Cl. ...................................................... 705/37
(58) Field of Classification Search .................... 705/37
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,903,201 A | 2/1990 | Wagner |
| 4,980,826 A | 12/1990 | Wagner |
| 5,038,284 A | 8/1991 | Kramer |
| 5,101,353 A | 3/1992 | Lupien et al. |

(Continued)

FOREIGN PATENT DOCUMENTS

EP 0 752 135 2/1999

(Continued)

OTHER PUBLICATIONS

Federal Register vol. 67, No. 222 Nov. 18, 2002.*

(Continued)

*Primary Examiner*—Thu-Thao Havan
*Assistant Examiner*—Thomas M Hammond, III
(74) *Attorney, Agent, or Firm*—Brinks Hofer Gilson & Lione

(57) ABSTRACT

A method of providing an automated auction for internalization for the purchase or sale of securities or derivatives in an exchange is disclosed. The method may include receiving an order at an electronic trade engine, disseminating a request for price message to at least one user in response to receiving the order, receiving a one-sided response message representative of a participant-type in response to the request for price message, selecting an allocation algorithm from a plurality of allocation algorithms, initiating the selected allocation algorithm and allocating the order according to the participant-type upon termination of the selected auction. The system may include an electronic trading engine configured to disseminate an auction message in response to an order, a database of allocation algorithms, and a trade processor for initiating an auction according the one of the allocation algorithms and terminating the auction upon defined early termination events.

13 Claims, 2 Drawing Sheets

U.S. PATENT DOCUMENTS

| | | |
|---|---|---|
| 5,136,501 A | 8/1992 | Silverman et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,315,634 A | 5/1994 | Tanaka et al. |
| 5,557,517 A | 9/1996 | Daughterty, III |
| 5,664,115 A | 9/1997 | Fraser |
| 5,689,652 A | 11/1997 | Lupien et al. |
| 5,715,402 A | 2/1998 | Popolo |
| 5,744,877 A | 4/1998 | Owens |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Spepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,722 A | 1/2000 | Jones et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 | 11/2001 | Lange |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Gary |
| 6,647,374 B2 | 11/2003 | Kansal |
| 7,039,610 B2 | 5/2006 | Morano et al. |
| 7,047,218 B1 | 5/2006 | Wallman |
| 7,085,738 B2 | 8/2006 | Tarrant |
| 7,099,839 B2 | 8/2006 | Madoff et al. |
| 7,225,153 B2 | 5/2007 | Lange |
| 7,233,922 B2 | 6/2007 | Asher et al. |
| 7,236,953 B1 | 6/2007 | Cooper et al. |
| 7,246,093 B1 | 7/2007 | Katz |
| 7,260,554 B2 | 8/2007 | Morano et al. |
| 7,296,025 B2 | 11/2007 | Kung et al. |
| 7,333,950 B2 | 2/2008 | Shidler et al. |
| 7,389,264 B2 | 6/2008 | Kemp, II et al. |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0032629 A1 | 3/2002 | Siegel, Jr. et al. |
| 2002/0052816 A1 | 5/2002 | Clenaghan et al. |
| 2002/0082967 A1 | 6/2002 | Kaminsky et al. |
| 2002/0087365 A1 | 7/2002 | Kavanaugh |
| 2002/0099640 A1 | 7/2002 | Lange |
| 2002/0103738 A1 | 8/2002 | Griebel et al. |
| 2002/0128952 A1 | 9/2002 | Melkomian et al. |
| 2002/0138401 A1 | 9/2002 | Allen et al. |
| 2002/0147670 A1 | 10/2002 | Lange |
| 2002/0152152 A1 | 10/2002 | Abdelnur et al. |
| 2002/0156716 A1 | 10/2002 | Adatia |
| 2002/0156718 A1 | 10/2002 | Olsen et al. |
| 2002/0198813 A1 | 12/2002 | Patterson, Jr. et al. |
| 2003/0004858 A1 | 1/2003 | Schmitz et al. |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0028462 A1 | 2/2003 | Fuhrman et al. |
| 2003/0028468 A1 | 2/2003 | Wong et al. |
| 2003/0093352 A1 | 5/2003 | Muralidhar et al. |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0139998 A1 | 7/2003 | Gilbert et al. |
| 2003/0167175 A1 | 9/2003 | Salom |
| 2003/0172026 A1 | 9/2003 | Tarrant |
| 2003/0177077 A1 | 9/2003 | Norman |
| 2003/0177086 A1 * | 9/2003 | Gomber et al. ............... 705/37 |
| 2003/0182220 A1 | 9/2003 | Galant |
| 2003/0208430 A1 | 11/2003 | Gershon |
| 2003/0220865 A1 | 11/2003 | Lutnick |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0019554 A1 | 1/2004 | Merold et al. |
| 2004/0024681 A1 | 2/2004 | Moore et al. |
| 2004/0024689 A1 * | 2/2004 | Zhou et al. ................... 705/37 |
| 2004/0030630 A1 | 2/2004 | Tilfors et al. |
| 2004/0088242 A1 | 5/2004 | Ascher et al. |
| 2004/0103050 A1 | 5/2004 | Long |
| 2004/0111358 A1 | 6/2004 | Lange et al. |
| 2004/0133439 A1 | 7/2004 | Noetzold et al. |
| 2004/0158520 A1 | 8/2004 | Noh |
| 2004/0199450 A1 | 10/2004 | Johnston et al. |
| 2004/0215538 A1 | 10/2004 | Smith et al. |
| 2004/0236636 A1 | 11/2004 | Lutnick et al. |
| 2004/0267657 A1 | 12/2004 | Hecht |
| 2005/0027643 A1 | 2/2005 | Amaitis et al. |
| 2005/0044019 A1 | 2/2005 | Novick et al. |
| 2005/0049948 A1 | 3/2005 | Fuscone |
| 2005/0097027 A1 | 5/2005 | Kavanaugh |
| 2005/0125326 A1 | 6/2005 | Nangalia et al. |
| 2005/0144104 A1 | 6/2005 | Kastel |
| 2005/0149428 A1 | 7/2005 | Gooch et al. |
| 2005/0165669 A1 | 7/2005 | Montanaro et al. |
| 2005/0209945 A1 | 9/2005 | Ballow et al. |
| 2005/0216384 A1 | 9/2005 | Partlow et al. |
| 2005/0267833 A1 | 12/2005 | Brodersen et al. |
| 2006/0008016 A1 | 1/2006 | Balakrishnan et al. |
| 2006/0036531 A1 | 2/2006 | Jackson et al. |
| 2006/0100949 A1 | 5/2006 | Whaley et al. |
| 2006/0106700 A1 | 5/2006 | Boren et al. |
| 2006/0106713 A1 | 5/2006 | Tilly et al. |
| 2006/0143099 A1 | 6/2006 | Partlow et al. |
| 2006/0149659 A1 | 7/2006 | Carone et al. |

| | | | |
|---|---|---|---|
| 2006/0167788 A1 | 7/2006 | Tilly et al. | |
| 2006/0167789 A1 | 7/2006 | Tilly et al. | |
| 2006/0253354 A1 | 11/2006 | O'Callahan | |
| 2006/0253355 A1 | 11/2006 | Shalen | |
| 2006/0253359 A1 | 11/2006 | O'Callahan | |
| 2006/0253367 A1 | 11/2006 | O'Callahan et al. | |
| 2006/0253368 A1 | 11/2006 | O'Callahan et al. | |
| 2006/0253369 A1 | 11/2006 | O'Callahan | |
| 2006/0253370 A1 | 11/2006 | Feuser et al. | |
| 2007/0011081 A1 | 1/2007 | Bok et al. | |
| 2007/0078740 A1 | 4/2007 | Landle et al. | |
| 2007/0106585 A1 | 5/2007 | Miller | |
| 2007/0112659 A1 | 5/2007 | Shalen et al. | |
| 2008/0059356 A1 | 3/2008 | Brodsky et al. | |
| 2008/0065560 A1 | 3/2008 | Bloom | |
| 2008/0120249 A1 | 5/2008 | Hiatt | |
| 2008/0120250 A1 | 5/2008 | Hiatt, Jr. | |
| 2008/0154790 A1 | 6/2008 | Hiatt | |
| 2008/0183640 A1 | 7/2008 | Shalen | |
| 2008/0243676 A1 | 10/2008 | Smith | |

FOREIGN PATENT DOCUMENTS

| | | |
|---|---|---|
| EP | 0 952 536 A1 | 10/1999 |
| WO | WO 00/28449 | 5/2000 |
| WO | WO 00/48053 | 8/2000 |
| WO | WO 00/57307 A1 | 9/2000 |
| WO | WO 00/70506 | 11/2000 |
| WO | WO 01/22263 | 3/2001 |
| WO | WO 01/22269 | 3/2001 |
| WO | WO 01/22313 | 3/2001 |
| WO | WO 01/22315 | 3/2001 |
| WO | WO 01/22332 | 3/2001 |
| WO | WO 01/88808 | 11/2001 |
| WO | WO 02/37396 A2 | 5/2002 |
| WO | WO 02/077766 A2 | 10/2002 |

OTHER PUBLICATIONS

Evans et al. "The Effects of Electronic Trading System On Open-outcry Commodity Exchange", Social Science 410, Nov. 1998.

Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.

Tsang, R. "Open outcry and electronic trading in futures exchanges", Bank of Canada Review, Spring 1999, pp. 21-39.

Elind Computers Private LMTD, "Online Global Trading System for Marketplaces", brochure, no date.

C. Danis, et al. "Alternatives to an Open Outcry Market: An Issue of Supporting Cooperation in a Competitive Situation", IBM TJ Watson Research Center, USA.

Clemens et al., "Segmentation, differentiation, and flexible pricing: Experiences with information technology and segment-tailored strategies", Journal of Management Information Systems: JMIS, vol. 11, No. 2, pp. 9-36, Fall 1994.

"Squeezing the poor", Guardian, p. 8, Feb. 11, 1997.

"La Libre competencia sacude a las electricas", Actualidad Economica, p. 18, Sep. 30, 1996.

Souter, Gavin, "Bermuda's reinsurers eager to please", Business Insurance, vol. 28, No. 44, p. 77, Oct. 31, 1994.

"The Electronic Component", The Options Institute Online Learning Center, obtained at the internet address: http://www.cboe.com/LearnCenter/cboeeducation/Course_02_02/mod_02_03.html.

"Self-Regulatory Organizations; Notice of Filing of Proposed Rule Change and Amendment No. 1 Thereto by the Pacific Exchange, Inc. Relating to the Exchange's New Trading Platform for Options, PCX Plus", 67 Fed. Reg. 69,580-69,592 (Nov. 18, 2002).

E. Clemons et al., "Information Technology and Screen-Based Securities Trading: Pricing the Stock and Pricing the Trade", Management Science, vol. 43, No. 12, Dec. 1997.

"The Pandora's Box over autoquotes; Industry Trend or Event", Wall Street & Technology, Section No. 3, vol. 13, p. 38; ISSN: 1060-989X, Mar. 1997.

"How is a Trade Executed—Limit Order", Nasdaq, dated Mar. 7, 2000, One Page.

S. Cosgrove, "Courting Retail, Institutional Customers, CBOE, AMEX Get Creative", Knight-Ridder Financial News, Jan. 29, 1993.

Self-Regulatory Organizations: Proposed Rule Change by the Cincinnati Stock Exchange Relating to Small Order Execution Guaranty, 1985 WL 547562; SEC Release No. 22330, Aug. 15, 1985.

A Monitoring Report On The Operation Of The Cincinnati Stock Exchange National Securities Trading System, U.S. Securities And Exchanges Commission, May 1981.

A Report On The Operation Of The Cincinnati Stock Exchange National Securities Trading System 1978-1981, U.S. Securities And Exchange Commission, Sep. 1982.

CBOT Press Release Entitled "Impressive Project A® Provides Extended Opportunity In CBOT Financial Complex", dated Jan. 1995, printed from the Internet at http://web.archive.org/web/19990429192354/finance/wat.ch/SCFOA/bulletin/_0001960.htm on Oct. 31, 2005, 3 pages.

A. Frino et al., Price And Time-Priority Versus Pro-Rata Algorithms In Electronically Traded Futures Markets: Simulation Based Performance Characteristics, Oct. 3, 1998, http://www.sirca.org.au/research/database.html (Document 1998009.pdf).

A. Frino et al., The Liquidity Of Automated Exchanges: New Evidence From Germany Bund Futures, vol. 8, Journal Of International Financial Markets, Institutions And Money, pp. 225-241 (1998).

Self-Regulatory Organization; Chicago Stock Exchange, Inc.; Order Approving Proposed Rule Change Creating The Chicago Match System (59 F.R. 63141) SEC Release No. 34-35030, 1994 SEC LEXIS 3863, Nov. 30, 1994.

A. Sarker et al., "Electronic Trading On Futures Exchanges," Current Issues In Economics And Finance, Federal Reserve Bank Of New York, vol. 4, No. 1, Jan. 1998.

Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.

CBOE Rules, CCH (1989) (Rules 6.45-8.80).

CBOE Information Circular IC 93-88 (Nov. 18, 1993).

U.S. Congress, Office Of Technology Assessment, "Electronic Bulls And Bears: U.S. Securities Markets And Information Technology", OTA-CIT-469 (Washington, DC: U.S. Government Printing Office, Sep. 1990).

Self-Regulatory Organizations; Filing and Order Gracting Accelerated Approval of Proposed Rule Change by the Chicago Board Options Exchange, Inc., Relating to System Modifications to the Retail Automated Execution System, SEC Release No. 34-32879, 58 F.R. 49342, Sep. 22, 1993.

CBOE Regulatory Circular RG 91-71, Dec. 25, 1991.

Notice Of Receipt Of Plan Filed Pursuant To Section 11A(a)(3)(B) Of The Securities Exchange Act Of 1934; 1980 WL 29398, SEC Release No. 16519, Jan. 22, 1980.

New York Stock Exchange Constitution And Rules (Commerce Clearing House, Inc. New York Stock Exchange Guide) Jul. 15, 1965, pp. 2644-2645; 2682-2683.

R. Teweles et al., The Stock Market, Fifth Edition, John Wiley & Sons, 1987, pp. 176-181.

J. Meeker, The Work Of The Stock Exchange, The Ronald Press Company 1923, pp. 108-109.

CBOE Information Circular IC91-15, Feb. 25, 1991.

Domowitz, Ian, "A taxonomy of automated trade execution", Journal of International Money and Finance (1993), 12, 607-631.

SEC Notice, Release No. 34-37959, SR-CBOE-2002-05, Federal Register vol. 68, No. 110, dated Monday, Jun. 9, 2003, pp. 34441-34448.

Original Rule Filing and Amendment No. 1 to SR-CBOE-2002-05, Submitted to SEC on Jan. 16, 2002, 36 pages.

Amendment No. 2 to SR-CBOE-2002-05, Submitted to SEC on May 16, 2002, 21 pages.

Amendment No. 3 to SR-CBOE-2002-05, Submitted to SEC on Jan. 15, 2003, 69 pages.

Amendment No. 4 to SR-CBOE-2002-05, Submitted to SEC on Apr. 3, 2003, 71 pages.

Amendment No. 5 to SR-CBOE-2002-05, Submitted to SEC on May 15, 2003, 3 pages.

Amendment No. 6 to SR-CBOE-2002-05, Submitted to SEC on May 30, 2003, 8 pages.

SEC Notice, Release No. 34-39086, SR-PCX-97-18, Federal Register vol. 62, No. 185, dated Wednesday, Sep. 24, 1997, pp. 50036-50048.

Angel, James J., "How Best to Supply Liquidity to a Small-Capitalization Securities Market", Georgetown University, Jul. 15, 1996, 27 pages.

Co-Pending U.S. Appl. No. 60/986,727, Filed Nov. 9, 2007.

SEC Notice, Release No. 34-46803, SR-PCX-2002-36, Federal Register vol. 67 No. 222, dated Monday, Nov. 18, 2002, pp. 69580-69592.

SEC Notice, Release No. 34-51107, SR-CBOE-2004-75, Federal Register vol. 70, No. 23, dated Friday, Feb. 4, 2005, pp. 6051-6057.

PCX Plus *The Pacific Exchange*, PCX Plus Overview, Oct. 9, 2003, six pages.

The National Association of Securities Dealer, Inc. "NASD Notice to members" 00-65, Sep. 2000, 5 pages.

Special Study: Payment for Order Flow and Internalization in the Options Markets, www.sec.gov/new/studies/ordpay.htm, printed on Oct. 22, 2001, 39 pages.

"smartRay.com Delivers Stock Quotes and Financial Information to Wireless Devices for Free !", PR Newswire, p. 2870, Dec. 16, 1999.

Glen, Jack D., "Trading and information systems in two emerging stock markets", East Asian Executive Reports, vol. 16 No. 12, pp. 8, 14, Dec. 15, 1994.

Michaels, Jenna, "NASD'S Global Fumble", All Street & Technology, vol. 9 No. 11, pp. 5762, Jul 1992.

"PHLX Files Rule Changes to Improve Handling Orders on Pace", Securities Week, p. 5, Jul. 17, 1989.

"NYSE Votes to Restrict Computerized Trading", San Jose Mercury News, Feb. 5, 1988.

SEC Notice, Release No. 34-47676, SR-CBOE-2002-05, Federal Register vol. 68 No. 77, dated Tuesday, Apr. 22, 2003, pp. 19865-19874.

Raithel, Tom, article titled "Major Changes Seen For Exchanges", *Evansville Courier and Press*, Apr. 12, 2000, p. B.6.

Demeterfi, Kresimir, et al., "More Than You Ever Wanted To Know About Volatility Swaps," Goldman Sachs Quantitative Strategies Research Notes, Mar. 1999.

CBOE Futures Exchange letter dated May 17, 2004, to Commodity Futures Trading Commission with accompanying pages containing rules, terms, and conditions for a new product to be traded on the CBOE Futures Exchange, 8 pages.

Press Release article, "CBOE Announces Launch of Futures on VIX: First Tradable Volatility Product Will be Offered on New CBOE Futures Exchange," Sep. 5, 2003, two pages.

Sulima, Cheryl, "Volatility and Variance Swaps", *Capital Markets News*, Federal Reserve Bank of Chicago, Mar. 2001.

Transitions 1-3, *Transitions Trading* website, retrieved using: www.archive.org Jul. 29, 2004 and Dec. 11, 2004.

Bounds for A Volume Weighted Average Price Option, A. W. Stace, Sep. 24, 2004.

Hull, J. and White, A., "The Valuation of Credit Default Swap Options", *Journal of Derivatives*, vol. 10, No. 3, 2003, p. 40.

Duffie, D. and Huang, M., "Swap Rates And Credit Quality", Mar. 31, 1995.

Blahnik, Mike, "Internet Opens Up Trading Frontiers", Star Tribune, Metro Edition, Minneapolis, MN, Retrieved from: http://web.archive.org/web/20040322223904/http://www.intrade.com/, dated Jul. 25, 2004.

Bogomolny, Laura,: Wanna Make A Bet?, Canadian Business, Toronto, vol. 77, Iss. 21, Oct. 25 to Nov. 7, 2004.

Sodergreen, John, "Product profile: Economic Derivatives in the Energy Sector", *Futures Industry Magazine*, Jan.-Feb. 2005 issue, retrieved from http://www.futuresindustry/org/fi-magazine-home.asp?v=p&q=1018 on May 20, 2008.

Whaley, Robert. "Return and Rick of CBOE Buy Write Monthly Index", *The Journal of Derivatives*, 2002, pp. 35-42.

Chicago Board of Options Exchange, Inc. Description of the CBOE S & P 500 BuyWrite Index ($BXM^{sm}$), 5 pages, 2004.

Morgan Stanley, "Global Medium-Term Notes, series F", *Registration statement* No. 333-117752, Securities Commission and Exchange, 2004, pp. 22-26.

Chicago Board of Options Exchange, Inc. The New CBOE Volatility Index, 19 pages, 2003.

U.S. Appl. No. 11/849,835, filed Sep. 4, 2007, entitled "System And Method For Creating And Trading A Derivative Investment Instrument Over A Range Of Index Values", Applicant: O'Connell et al.

U.S. Appl. No. 12/112,605, filed Apr. 30, 2008, entitled "System And Method For Creating And Trading A Derivative Investment Instrument Over A Range Of Index Values", Applicant: O'Connell et al.

U.S. Appl. No. 12/267,013, filed Nov. 7, 2008, entitled "Method And System For Creating A Volatility Benchmark Index", Applicant: Catherine T. Shalen.

* cited by examiner

METHOD AND SYSTEM FOR PROVIDING AN AUTOMATED AUCTION FOR INTERNALIZATION AND COMPLEX ORDERS IN A HYBRID TRADING SYSTEM

CROSS-REFERENCE TO RELATED PATENT APPLICATIONS

This application is a Continuation-In-Part of pending U.S. application Ser. No. 10/423,201, filed Apr. 24, 2003, and claims the benefit of pending U.S. Provisional Application No. 60/632,726, filed Dec. 1, 2004. Both of the aforementioned applications are incorporated herein by reference in their entirety.

TECHNICAL FIELD

The present invention relates to the trading of securities or derivatives, such as options or futures. More particularly, the present invention relates to an exchange system and method for providing an automated auction for internalization and complex orders in a system of concurrent trading of securities or derivatives through both electronic and open-outcry trading mechanisms.

BACKGROUND

The introduction of electronic trading mechanisms into exchanges for securities and derivatives has been an ongoing process. The desire for immediacy of order execution and dissemination of information is a predominant reason for the steady substitution to electronic mechanisms. As trading volume continues to grow, along with the accompanying need for an increasingly efficient trading environment, the move toward electronic trading mechanisms is favored.

Electronic exchanges, while efficient and nearly instantaneous, do not necessarily provide for the automated auction for internalization and complex orders as is done in traditional, open outcry trading environments. Presently, on some exchanges, such as the Chicago Board Options Exchange, complex orders and internalized orders are traded in open outcry. Other all-electronic exchanges have automated this functionality in efforts to attract order flow. It is desirable for an exchange utilizing an open outcry component to provide an auction mechanism for internalization and complex orders, including those with stock, as well as for simple orders.

Accordingly, there is a need for an exchange system and method that can address the drawbacks of both traditional open outcry exchanges and electronic exchanges as they pertain to the trading of simple orders, complex orders and internalized orders.

SUMMARY

In order to address the need for improvements on electronic trading mechanisms, a trading platform and method is disclosed herein that provides for the automated auction for internalization, complex orders and simple orders in a system of concurrent trading of securities or derivatives through both electronic and open-outcry trading mechanisms.

According to a first aspect of the invention, method of providing an automated auction for internalization for the purchase or sale of securities or derivatives in an exchange configured for trading securities or derivatives is provided. The method includes receiving an order at an electronic trade engine, disseminating a request for price message from the electronic trade engine to at least one user in response to receiving the order, receiving a one-sided response message representative of a participant-type at the electronic trade engine in response to the request for price message from the at least one user, selecting an allocation algorithm from a plurality of allocation algorithms, each allocation algorithm representative of an auction-type and having at least one starting price associated therewith, initiating the selected allocation algorithm, wherein the auction occurs for a period between M and N seconds, and allocating the order according to the participant-type upon termination of the selected auction.

In another aspect of the invention, method of auctioning complex orders for the purchase or sale of securities or derivatives in an exchange configured for trading securities or derivatives by a combination of electronic and open-outcry trading mechanisms is disclosed. The method includes receiving a complex order at an electronic trade engine, adding a top-of-the-spread market to the complex order, verifying the complex order qualifies for auction, disseminating a request for price message from the electronic trade engine to at least one user, receiving a two-sided response message comprising a participant-type at the electronic trade engine in response to the request for price message from the at least one user, selecting a starting price for the auction, the starting price equal to the better of an exchange market spread, a customer limit price or a limit price on any resting spread order, initiating the auction substantially instantaneously upon receipt of the two-sided response message, wherein the auction occurs for a period between M and N seconds, and allocating the complex order based on participant-type priority.

In yet another aspect of the invention, a method for providing an automated auction for the purchase or sale of securities or derivatives in an exchange configured for trading securities or derivatives in an exchange configured for trading securities or derivatives is described. The method includes receiving an order at an electronic trade engine, disseminating an auction message to all market makers quoting a class in response to receiving the order, initiating an auction for the order when the size from a market maker is sufficient to fulfill a firm quote obligation, prohibiting the market maker quoters in a series from moving quotes on the side being auctioned, and wherein the auction terminates prior to an auction expiration upon an occurrence of an early termination event.

In still another aspect of the invention, a method of providing an automated auction for complex orders for the purchase or sale of securities or derivatives in an exchange configured for trading securities or derivatives is disclosed. The method includes receiving an order at an electronic trade engine, disseminating a request for price message from the electronic trade engine to at least one user in response to receiving the order, receiving a two-sided response message comprising a participant-type at the electronic trade engine in response to the request for price message from the at least one user, selecting an allocation algorithm from a plurality of allocation algorithms, each allocation algorithm representative of an auction-type and having at least one starting price associated therewith, initiating the selected allocation algorithm, wherein the auction occurs for a period between M and N seconds, and allocating the order according to the participant-type upon termination of the selected auction.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION OF THE DRAWINGS AND THE PRESENTLY PREFERRED EMBODIMENTS

A system and method for providing an automated auction for internalization and complex orders in a system of concurrent trading of securities or derivatives through both electronic and open-outcry trading mechanisms is described herein.

Figure 1:
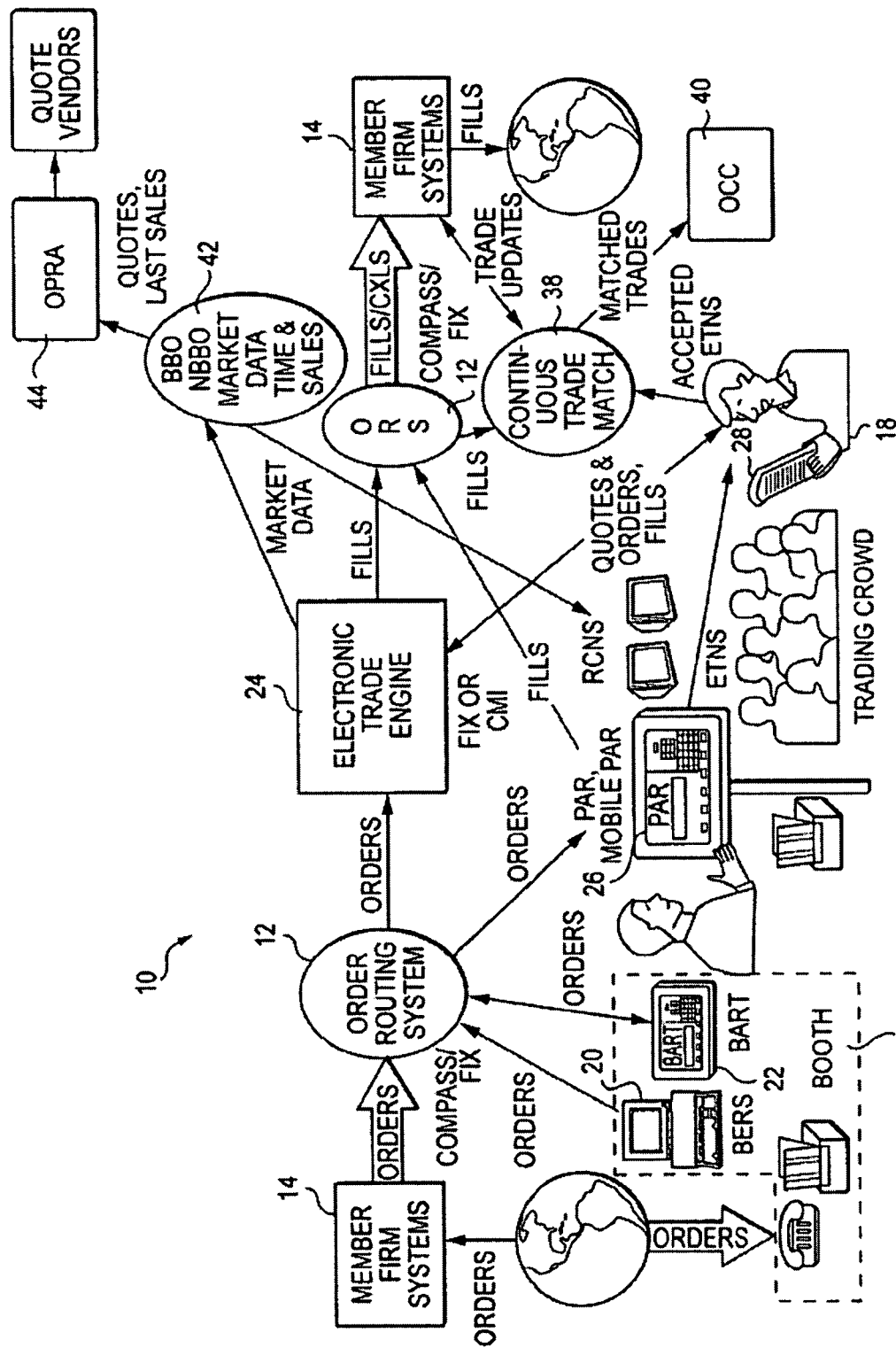
FIG. 1 is a diagram of a hybrid exchange system merging screen-based electronic orders with traditional open-outcry floor trading.

Referring to FIG. 1, one embodiment of an exchange system combining aspects of electronic, screen-based trading with traditional, open-outcry trading suitable for implementing various securities and derivatives trading methods described herein is illustrated. The system 10 receives order information for the purchase or sale of securities, for example derivatives such as stock options, from numerous sources at a central order routing system (ORS) 12. ORS 12 may be any of a number of data processing systems or platforms capable of managing multiple transactions, as are well known in the art. For example, in one embodiment, the order routing system can be implemented on a transaction processing facility (TPF) platform manufactured by IBM Corporation. For purposes of clarity, the examples herein will refer specifically to options. It should be understood that the system and methods disclosed herein might be applied to the trading of other types of securities and derivatives.

Accordingly, an exchange utilizing the system and methods described herein may manage a number of classes of derivatives, where each of the plurality of classes of derivatives are associated with an underlying asset such as a stock, a bond, a note, a future, an exchange traded fund, an index, a commodity or other known asset types.

Information, such as orders may be entered into the ORS 12 from remote member firm systems 14, from member firm's booths 16 physically located at the exchange system 10 and from market makers 18 present on the trading floor of the exchange. The member firm systems 14 may be located remotely from the geographical location of the exchange and use any of a number of standard landline or wireless communication networks to direct orders electronically to the ORS 12. The member firm systems 14 communicate with one of several interfaces or protocols for transmitting their orders to the ORS 12. Examples of suitable interfaces are those using a distributed object interface based on the CORBA standard and available from the Object Management Group. Interfaces such as financial information exchange (FIX), which is a message-based protocol implemented over TCP/IP available from FIX Protocol, Ltd., or other known securities transaction communication protocols are also suitable protocols. In some instances, orders may even be made by telephone calls or facsimile transmissions directly to the booths 16 of member firms at the exchange. Orders submitted from a booth 16 at the exchange may come from a booth entry and routing system (BERS) 20 or a booth automated routing terminal (BART) 22.

The BERS 20 is a computer workstation that provides firm staff members at the booth with an entry template and a graphic user interface with a number of function buttons arranged on the display. Orders entered at the booth through BERS 20 typically consist of orders that were telephoned to the booth and orders that were wired to member firm-owned house printers in the booth. The orders entered through BERS are done so manually by booth staff using an order template and graphic user interface on the workstation. Generally, an order entered at BERS 20 will be routed to the ORS 12. Member firms, however, may specify that a particular order entered through BERS be routed to the BART 22 device. The BART 22 device, sometimes referred to as the "electronic runner," allows member firms to maintain more control over their order flow. BART 22 allows each firm to customize certain ORS 12 parameters to route a certain portion of their order flow to the firm booth. For example, firms may instruct ORS 12 to send certain orders directly to their booths 16 based on the size of the order.

As with the BERS 20, BART 22 may be implemented on a touch-screen workstation located in the member firm booth. The BART 22 operator at the booth may electronically forward orders to desired destinations. Potential destinations for these booth-routed orders are the ORS 12, the electronic trade engine 24 in communication with the ORS 12, or the public automated routing (PAR) system 26 used by the floor brokers at the exchange. The PAR system 26 may be implemented as a PC-based, touch-screen order routing and execution system accessible by floor brokers on the floor of the exchange.

It is preferred that the PAR system 26 be accessible by a floor broker inputting a broker-specific identifier therein. The broker-specific identifier is preferably a personal identification number (PIN) or other coded identifier known and specific to the floor broker. Once accessed by the floor broker, the PAR system 26 terminals, for example, allow a floor broker to select an order from the workstation and receive an electronic trading card or template on which the floor broker may enter trade information such as its volume, price, opposing market makers, or the like. When a floor broker completes an electronic template, the floor broker can then execute a trade electronically with the touch of a finger on the couch screen interface. The PAR system 26 then transmits the completed order, also referred to as a "fill," back to the ORS 12. The ORS 12 can then mark the completed order with the broker's broker-specific identifier to associate a particular order with a specific broker. This benefits the broker by permitting the broker to demonstrate which orders she handled so that a charge may be passed on to the customer. The PAR 26 may be a fixed workstation or a mobile workstation in the form of a hand-held unit.

When a trade is completed, whether on the floor in open outcry and entered into PAR 26 or automatically executed through the electronic trade engine 24, the fill information is sent through the electronic trade engine 24 and ORS 12. ORS 12 passes the fill information to the member firm systems and to a continuous trade match (CTM) system 38 which matches the buy side and sell side of a trade which, in turn, forwards the matched trades to the Options Clearing Corporation (OCC) 40, a third party organization that will verify that all trades properly clear. The electronic trade engine 24 also sends quote and sale update information through an internal distribution system 42 that will refresh display screens within the exchange 10 and format the information for submission to a quote dissemination service such as the Options Price Reporting Authority (OPRA) 44.

Figure 2:
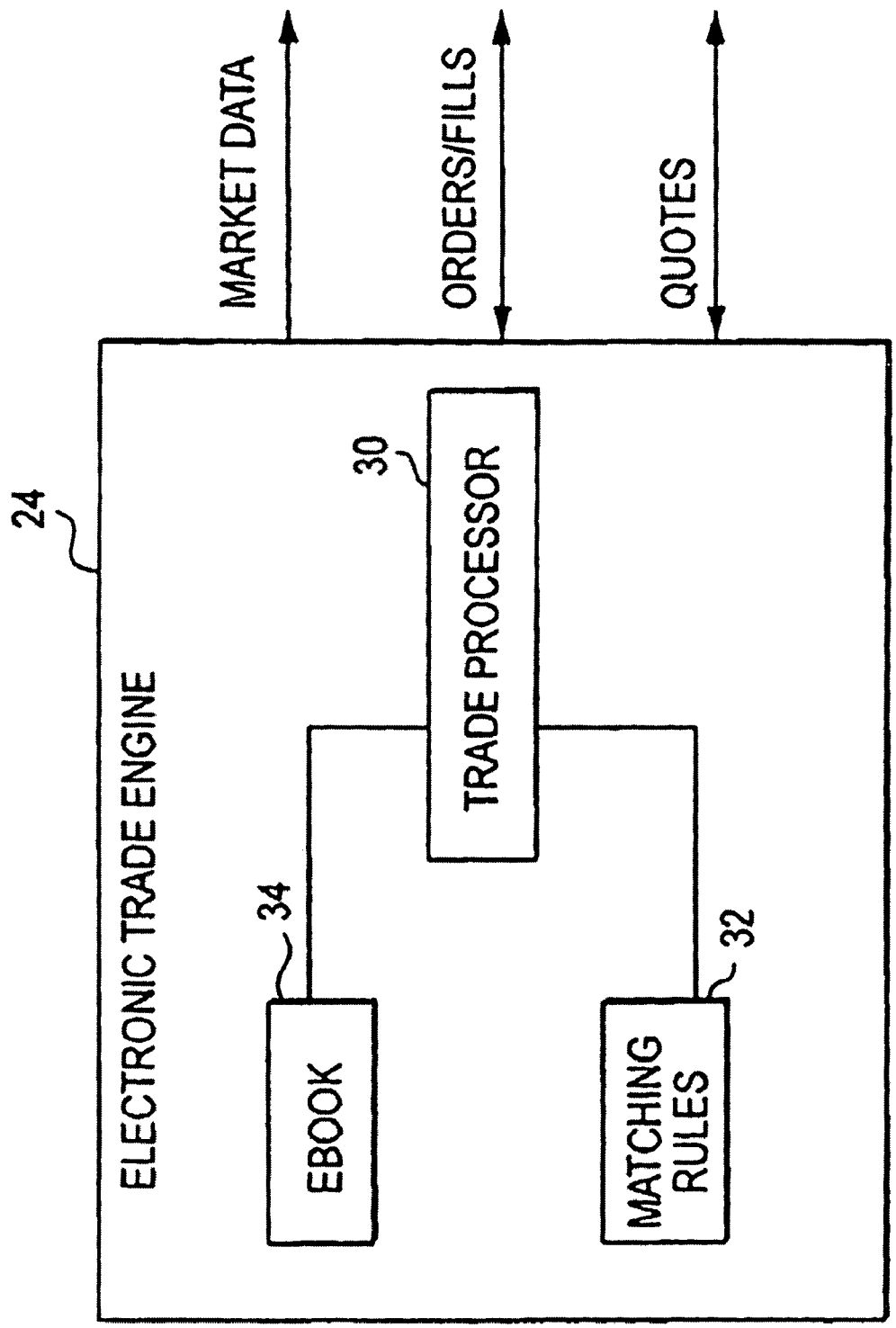
FIG. 2 is a block diagram of the electronic trading engine of FIG. 1.

As illustrated in FIG. 2, an electronic trade engine 24 contains a trade processor 30 that analyzes and manipulates orders according to matching rules 32 stored in the database in communication with the trade processor 30, as described in co-pending U.S. patent application Ser. No. 10/423,201, and U.S. Provisional Application No. 60/632,726, both of which are incorporated herein by reference. Also included in the electronic trade engine is the electronic book (EBOOK) 34 of orders and quotes with which incoming orders to buy or sell are matched with quotes and orders resting on the EBOOK 34 according to the matching rules 32. In an embodiment, upon a match, the electronic trade engine 24 will mark the matched order or quote with the broker-specific identifier so that the broker sending the order or quote information can be identified. The electronic trade engine 24 may be a stand-alone or distributed computer system. Any of a number of hardware and software combinations configured to execute the trading methods described below may be used for the electronic trade engine 24. In one embodiment, the electronic trade engine 24 may be a server cluster consisting of servers available from Sun Microsystems, Inc., Fujitsu Ltd. or other known computer equipment manufacturers. The EBOOK 34 portion of the electronic trade engine 24 may be implemented with Oracle database software and may reside on one or more of the servers comprising the electronic trade engine 24. The rules database 32 may be C++ or java-based programming accessible by, or executable by, the trade processor 30.

When a trade is completed, whether on the floor in open outcry and entered into PAR 26 or automatically executed through the electronic trade engine 24, the fill information is sent through the electronic trade engine 24 and ORS 12. ORS 12 passes the fill information to the member firm systems and to a continuous trade match (CTM) system 38 which matches the buy side and sell side of a trade which, in turn, forwards the matched trades to the Options Clearing Corporation (OCC) 40, a third party organization that will verify that all trades properly clear. The electronic trade engine 24 also sends quote and sale update information through an internal distribution system 42 that will refresh display screens within the exchange 10 and format the information for submission to a quote dissemination service such as the Options Price Reporting Authority (OPRA) 44.

The Auction Process

In accordance with an embodiment of the present invention, selected orders received by the electronic trade engine 24 will be auctioned based on rules described for each auction-type.

It is preferred that the auction process will commence when the order is received at the electronic trade engine 24. To start the auction, the electronic trade engine 24 will disseminate a new Request for Price (RFP) message through an Application Program Interface (API), which specifies the communication method and messages for one computer system to communicate with another, between the electronic trade engine 24 and member firm systems 14 and/or other financial market participants that will indicate the minimum price, side and size of the order that initiated the auction and any contingency, if required.

It is preferred that the RFP messages be disseminated to those quoters that are quoting any series in the underlying stock at the time the RFP is sent and the firm initiating the auction, if the order was for internalization. It is further preferred that responses to the RFP messages be "blind," i.e., they will not be included in the top-of-the-market quotes being disseminated to OPRA 44 and the auction results will not be published through the API.

A response to the auction will not replace the user's quote, since the responses are one-sided. The responses will be treated like Immediate or Cancel (IOC) orders and will have a time to live equal to the auction response time. Users will be able to respond at multiple prices to the RFP. Responses may be cancelled or cancel/replaced during the auction period. Responses will not be routed through the ORS 12.

The auction will start immediately upon receipt of the order and will be live for a random period of time between M and N seconds, where M and N may be the same. The time period is modifiable and preferably short in duration, for example between 2 and 3 seconds. At the end of the auction period, the original order will be filled at the best price(s) available from the auction. If the order cannot be filled at a price equal to or better than when the order arrived, the order may route to the PAR 26.

Further, the order will be allocated according to a selected allocation algorithm. Allocation of the order to RFP respondents and quoters is preferably performed through different mechanisms depending on the type of the auction, i.e. internalization orders will be allocated differently than complex orders. These mechanisms described in detail below with respect to the sections relating to the auction-type.

It is further preferred that all auction information, including the RFP and all of the responses, will be stored in data tables, such as Oracle tables, and will be available in market replay. Additionally, quote locks and quote triggers preferably end when the auction starts.

The parameters detailed herein are preferably provided within the electronic trade engine 24, unless otherwise stated. It is further preferred that the allocation algorithm be configurable by class and/or by auction-type. For example, matching algorithms can be used to allocate an incoming order to participants based on the number of participants and the order size each participant represents. In one matching algorithm, referred to herein as the Ultimate Matching Algorithm (UMA), orders are allocated to the multiple market participants quoting at the same price based on two components: an 'A' component, or parity factor, and a 'B' component, or pro rata/depth of liquidity factor. The parity factor of the matching algorithm treats as equal all market participants quoting at the relevant best bid or offer (BBO). Thus, if there were four market participants quoting or bidding at the best price, each would be assigned 25 percent for the parity component of the matching algorithm. Viewed in conjunction with the pro rata factor of the algorithm, the parity component of the algorithm provides incentive to market participants to quote at a better price than their competitors even though they may have a smaller quote size than other market participants quoting at the BBO.

The second component of UMA rewards those quoting larger sizes at the best price by providing the market participants a pro rata component based on the percentage of the volume of that market participant's quote size with reference to the sum of the total of all quote sizes at the best price. For example, if the disseminated quote represents the quotes of market makers x, y, and z who quote for 20, 30, and 50 contracts respectively, then the percentages assigned under the pro rata component are 20% for x, 30% for y, and 50% for z. The final allocation may then be determined by multiplying the average of the A and B components by the size of the incoming order available. In one embodiment, the matching algorithm described above produces the following equation:

$$\text{Participant's allocation of incoming order} = \text{incoming order} \\ \text{size} \times \left[ \frac{\frac{1}{\text{number of participants}} + \frac{\text{participant quote size}}{\sum \text{participant quote sizes}}}{2} \right]$$

Another matching algorithm, referred to herein as the Capped Ultimate Matching Algorithm (CUMA), may be implemented. In CUMA, the algorithm may be the same as UMA with the added feature that certain participants are limited in the size of their order that will be used to calculate the 'B' component of the equation. For example participants such as In Crowd Market Makers (ICMs) may be capped in this way so that, after other participants have already entered their order or quotes, the ICM cannot inflate the size of its order to obtain a greater pro rata weighting (and thus greater allocation) of the available order.

The length of the auction is also preferably configurable by auction-type and/or class and preferably includes parameters M and N seconds. The minimum allowable increment is preferably one penny. Generally, auctions performed in accordance with the present invention will be in penny increments, even though regular quoting is allowed only in nickel and dime increments. Minimum and maximum order size parameters for each type of auction are on a firm/class/origin basis. If an order does not meet these requirements, the order is routed back to the electronic trade engine 24 without any corresponding firm information. The order will then be routed based on parameters for standard orders. Additionally, a minimum number of quoters may be required to start an auction. In such a situation, a parameter that can be set for each class and auction-type indicating the minimum number of quoters is required. A further parameter that includes ticks away from the national best bid or offer (NBBO) can be provided so that when the exchange is not the NBBO, these orders can either route to the electronic trade engine 24 for an auction or route to the PAR 26 for handling in open outcry. Parameters are preferably available that permit the RFP messages to be distributed to a larger audience, such as all who subscribe to the message and allowing subscription by roles, i.e., all market makers 18, all market makers assigned to the class in MPP, all brokers, and the like.

In another embodiment, the electronic trade engine 24 can calculate the best bid or offer (BBO) from among all the quotes and orders entered and, when the exchange is at the NBBO, an incoming marketable order will be stopped at the exchange's BBO and auctioned for price improvement. The origins, order size and classes eligible for auction are preferably configurable. The starting price for the auction will preferably be the BBO/NBBO. Market makers 18 responding at the NBBO will only trade if there was not enough NBBO size at the start of the auction to fill the entire order.

The auction message will be disseminated to all market makers 18 quoting the class, and may additionally be distributed to other members that have orders resting at the top of the market as well.

At the end of the auction period, market makers 18 that were on the BBO at the start of the auction will have priority over those who were not at the BBO. It is preferred that priority be afforded only up to the quoters' original size. Additionally, DPMs, eDPMs and/or Preferred DPMs preferably retain a participation right if they were at the BBO and on the final auction price.

If there is not enough In Crowd Market Maker (ICM) size (quotes plus orders sent by floor-based market makers (ICMs) that function as one-sided quotes, or 'I' orders) on the BBO to cover the firm quote obligation for the incoming order, an auction will not be started. An auction will be started if the entire displayed size is from ICMs, but is still not large enough to fill the order since the firm quote obligation is the displayed size.

Further, to provide the stop for the auctioned order, the system will not allow quoters in the series to move their respective quotes on the side being auctioned. 'I' orders are preferably treated like quotes. Quote updates may be queued as they are in quote trigger situations.

Additionally, the auction may end early (and trade against the existing auction responses and BBO size) for the following reasons:

1. An incoming quote or 'I' order locks or crosses the displayed market;

2. An opposite side order (not an 'I' order) that is tradable against the auctioned order and equal to or greater than the size of the order. If it is smaller than the order size it will trade against the auctioned order and the auction will continue for the remainder of the order; or 3. A same side marketable order. This order will trade against any remaining responses to the previous auction and then an auction will start for it, if appropriate.

Complex Orders

A complex order is an order that includes more than one series or at least one series coupled with another security. Incoming complex orders will first route to the electronic trade engine 24 where the top-of-the-spread market will be added to the order. The order will route to the ORS 12 where it will follow firm/class/origin routing parameters. If the firm/class/origin routing parameters sent to the electronic trade engine 24 are not met, the order will be routed to the PAR 26 or BART 22 for manual handling. The order information will include the top-of-the-spread market from the electronic trade engine 24. The PAR 26 will add this information to the spread order ticket. Additionally, the PAR 26 user may query the electronic trade engine 24 to obtain the top-of-the-spread-market.

If the order does meet the firm/class routing parameters to send to the electronic trade engine 24, the ORS 12 will route the order to the electronic trade engine 24. The electronic trade engine 24 will determine if the order is eligible for auction based on the complex order auction parameters. If the order is not eligible it will be routed back to ORS 12 and handled as described above.

Certain types of incoming complex orders that are marketable against the leg quotes or the top-of-the-spread market will be eligible for the auction. The system 10 will determine whether they are eligible based on marketability and spread-type. The system 10 is preferably configurable to allow or disallow any of the following spread-types:

Vertical spread: buy a strike, sell another strike, same expiration month, all calls or all puts.

Calendar spread: buy a strike, sell same strike, different expiration months, all calls or all puts.

Diagonal spread: buy a strike, sell a different strike, different expiration months, all calls or all puts.

Combo spread: buy call, sell put or reverse, either same or different strike, same or different expiration month.

Butterfly spread: buy 1 at a strike, sell 2 at another strike, buy 1 at another strike, (or reverse) all calls or all puts, same expiration month.

Box spread: buy call/sell put at a strike, sell call/buy put at another strike, same expiration month.

Straddle/Strangle: buy call, buy put (or reverse), same strikes (straddle), different strikes (strangle).

Gut Strangles: a subset of regular strangles where both strikes are in-the-money.

Ratio spread: buy 1 at one strike, sell 2 at another strike, same expiration month, all calls or all puts.

The system 10 checks for marketability against the leg quotes or a resting spread order. A parameter is preferably available that will allow the order to route to auction if the order is N ticks away from the exchange market. When the marketable complex order arrives at the electronic trade engine 24, the auction process described above will be initiated. The starting auction price will be the better of the exchange spread market, the customer's limit price or the limit price on any resting spread orders. If the complex order cannot be filled at a price at least equal to the original market when the order arrived, the spread order will route to the ORS 12 and then to the PAR 26.

Allocation of the complex order will use a configured allocation algorithm and are preferably in the priority order. A complex order auction will end if a marketable order is received for any of the legs of the complex order.

Internalization

The internalization of options orders generally refers to firms trading as counter-parties with their customer orders, or firms routing to affiliated specialists, and reciprocal order routing agreements.

Orders to be internalized are preferably marked by the firm, as discussed in detail below.

The internalizing firm can set the price for its side of the order in one of three ways: 1) the firm can specify a limit price; 2) for auto match, described below; and 3) as an order that will guarantee the starting price of the auction. Alternatively, for certain types of internalized orders, the firm may participate in the auction as a quoter. For example, orders marked with T (described below) will result in the auction commencing if the quoter associated with the targeted firm is on the market.

The starting price of the auction will be determined through a parameter that will allow the starting price of the auction to be at either: 1) the better of the NBBO, the customer's limit price or the firm's limit price; or 2) the better of one tick better than the NBBO, the customer's limit price or the firm's limit price. This parameter is preferably configurable by order size. For example, orders of 50 contracts or less might require that the auction start at a price 1 tick better than the NBBO, while auctions for orders greater than 50 contracts might start at the NBBO.

It is further preferred that internalizing firms will be guaranteed a percentage of the order if the firms are at the final price of the auction. The percentage is a configurable parameter. For the purposes of illustration only, a percentage of 40% as the internalization percentage is employed, however any percentage (N %) may be used in accordance with the present invention. The internalizing firm sending the order guarantees 100% of the order at the starting point of the auction. The electronic trade engine 24 will ensure that the firm is guaranteeing the appropriate size and price prior to starting the auction. If these conditions are not met, an auction will not be started and the original order will follow standard routing parameters and the firm side of the order will be cancelled.

Additionally, the internalizing firm preferably has an option, by marking the original order, to have the electronic trade engine 24 respond to the RFP for the firm. For these orders, the electronic trade engine 24 will automatically match the best price quoted by any other participant in the RFP process. If the firm chooses this option there will be no limit as to the amount that the firm may have to step up to match other participants. The step-up amount will correspond to the size the step-up amount of the other market participants. For example if the market is 1.00-1.20 and an RFP is initiated by a 1.20 buy limit order for 100 contracts and at the end of the RFP period a market maker has stepped up to 1.15 for 10 contracts the internalizing firm will trade 10 contracts at 1.15 along with the market maker and then be allocated 40% of the remaining 80 contracts traded at 1.20. If there are step-ups at more than one price point the internalizing firm will match at each price for the appropriate size.

If the internalizing firm does not mark the order as a matching order the internalizing firm can either provide a limit price at which that firm is willing to trade or mark the order indicating that the firm is willing to participate at the starting auction price. If the auction ends at a better price than the firm's limit, the firm will not participate.

When the auction is complete the order will be allocated as follows: If the internalizing firm has not selected auto-match, the order will be allocated at each price point to the RFP respondents at those price points. For example, if the internalizing firm has a limit price that would allow it to participate it will receive 40% of the remainder of the order at the firm's limit price(s). If any part of the order is filled at the original market the following priority will be accorded: 1) customers resting at that price; 2) the internalizing firm will receive 40% of the remainder of the order; 3) any quoters who were at that market when the original order arrived and were there when the auction ended; and 4) any RFP respondents who responded at the original market, any new quoters at that market and the remainder of the internalizing firm's order. If the internalizing firm did select auto-match the above will occur with the exception that the internalizing firm will receive an allocation at each price point.

The configured allocation algorithm will be used to allocate to respondents at each price. For example, if the internalizing firm does not receive 40% of the order, the DPM complex will receive its allocation. If the internalizing firm does receive 40% of the order, the DPM complex will participate using the configured allocation algorithm and will not receive any further guarantee. If at the end of the auction any ICMs have move their quotes and are now quoting at the best price, they will be included in the allocation as though they were a respondent to the RFP. If a single market maker had a quote and an RFP response at the same price, the quote and the response will be combined for allocation. This is to prevent the market maker from obtaining two 'A' components in CUMA or UMA. If the internalizing firm also happens to be a quoter in the class and is part of the RFP response or has posted a quote that would participate, that quoter will not participate in the auction.

If a marketable non-ICM order is received at the electronic trade engine 24 during the RFP period on either side of the market the RFP period will end automatically and then the incoming order will be processed against the existing quotes. If a non-marketable non-ICM order is received at the electronic trade engine 24 during the RFP period on the opposite side of the order being auctioned that order will participate in the auction allocation if it is at the best price. If it is a customer order it will receive priority. Since the internalizing firm is guaranteeing the entire order, if the order cannot be filled by the other market participants at a price at least equal to the limit price of the internalizing firm order, the internalizing firm will fill any remainder of the order. The order of allocation is preferably configurable to allow as much flexibility as required.

Complex Orders with Stock Auction

Complex orders with stock preferably route to the auction using the same routing parameters as standard complex orders. The electronic trade engine 24 will book these orders or auction them as appropriate.

The auction will work in the same manner as described herein with respect to other auctions, with the exception that these orders will not be executable against the legs. These orders will only be executable against opposite side orders or responses to the RFP. Using the underlying stock price, the options price and the trade price for the order, the electronic trade engine 24 will calculate the stock price to send a stock print to another exchange, such as the CBOE stock exchange. The second exchange will determine if it can print the trade at the requested price.

If the second exchange determines that it can print the trade, the trade will be printed and a confirmation will route back to the first exchange and the electronic trade engine 24 will consummate the trade between the RFP respondents and the resting order. If the second exchange determines that it cannot print the trade, a reject will be routed back to the first exchange. The electronic trade engine 24 will have to then attempt the stock print at a new stock price. This auction is preferably available for all stock option orders including those with more than one options leg and those with a price for both the stock and the order. Odd lots on the stock order will not be accepted. Furthermore, an assumption is made that the option print can be at or within the first exchange's market and will be sent to a quote dissemination service such as the Options Price Reporting Authority (OPRA) 44 with a spread indicator. For underlying stock information, the electronic trade engine 24 will preferably use the stock feed being sent from a system that is used to receive and distribute the various outside data feeds (underlying security prices, options quotes, etc.) necessary for maintaining accurate displays on the trading floor (TIPS).

New Allocation Method for Auctions

The following is a new allocation methodology for auctions in accordance with the present invention.

For all auctions (either at the same or better price), priority is as follows:

1. Quoters in the legs that can fill the order in ratio;
2. Customers at the best spread market; and
3. RFP responses and non-customers at the best spread market.

As has been described above, the hybrid exchange system merges electronic and open outcry trading models while at the same time providing an automated auction for internalization and complex orders.

Although the system and methods described herein preferably relate to a hybrid system incorporating and involving active participation from a trading floor and a screen-based electronic trading crowd, many of the procedures described may be applied to an exclusively electronic, screen-based exchange that does not include floor based, open-outcry trading. As will be appreciated by those of ordinary skill in the art, mechanisms for the providing an automated auction for internalization and complex orders and other features described above may all be modified for application to electronic-only trading within the purview and scope of the present invention.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. It is therefore intended that the foregoing detailed description be regarded as illustrative rather than limiting, and that it be understood that it is the following claims, including all equivalents, that are intended to define the scope of this invention

The invention claimed is:

1. A method of providing an automated auction for internalization for the purchase or sale of securities or derivatives in an exchange configured for trading securities or derivatives, the method comprising:

receiving an order marked for processing in an internalization auction at an electronic trade engine;

the electronic trade engine disseminating a request for price message from the electronic trade engine to at least one user in response to receiving the order;

receiving a one-sided response message representative of a participant-type at the electronic trade engine in response to the request for price message from the at least one user, wherein the electronic trade engine prevents dissemination of the one-sided response message to an external reporting entity and an order routing system for the exchange;

the electronic trade engine selecting an allocation algorithm from a plurality of allocation algorithms, each allocation algorithm representative of an auction-type and having at least one starting price associated therewith;

the electronic trade engine initiating the selected allocation algorithm, wherein the auction occurs for a predetermined period of time; and the electronic trade engine allocating the order according to the participant-type upon termination of the selected auction.

2. The method according to claim 1, wherein the request for price message includes at least one of a minimum price data, side data, size of the order data or contingency data.

3. The method according to claim 1, wherein the auction type is a complex order auction.

4. The method according to claim 1 wherein the auction commences substantially instantaneously upon receipt of the one-sided response message.

5. The method according to claim 3, wherein the at least one starting price is a price equal to the better of an exchange spread market, a customer limit price or a limit price on any resting spread orders.

6. The method according to claim 4, wherein the at least one starting price is a price equal to the better of the national best bid or offer, a customer limit price or a firm limit price.

7. The method according to claim 4, wherein the at least one starting price is a price equal to the better of one tick better than the national best bid or offer, a customer limit price or a firm limit price.

8. The method according to claim 1 wherein the at least one starting price is a price equal to the better of the best bid or offer or national best bid or offer prevailing across multiple markets for a security or derivative.

9. The method according to claim 1 wherein the one-sided response message comprises multiple prices.

10. The method according to claim 1, wherein the participant-type is selected from the group consisting of customers, market makers, firms and brokers.

11. The method according to claim 1, wherein the order is further allocated based on the number of participants and the size each participant represents.

12. The method according to claim 3, wherein the complex order auction is configurable to allow or disallow at least one spread type.

13. The method according to claim 12, wherein the at least one spread type is selected from the group consisting of vertical spread, calendar spread, diagonal spread, combo spread, butterfly spread, box spread, straddle, strangle, gut strangles, and ratio spread.

* * * * *

UNITED STATES PATENT AND TRADEMARK OFFICE
CERTIFICATE OF CORRECTION

| | | |
|---|---|---|
| PATENT NO. | : 7,676,421 B2 | Page 1 of 1 |
| APPLICATION NO. | : 11/249018 | |
| DATED | : March 9, 2010 | |
| INVENTOR(S) | : Edward T. Tilly et al. | |

It is certified that error appears in the above-identified patent and that said Letters Patent is hereby corrected as shown below:

On the Title Page

Item (60), after "filed on" replace "Oct." with --Dec.--.

In the Claims

In column 12, claim 4, line 27, immediately after "to claim 1" insert --,--.

In column 12, claim 8, line 41, immediately after "to claim 1" insert --,--.

In column 12, claim 9, line 45, immediately after "to claim 1" insert --,--.

Signed and Sealed this

First Day of June, 2010

David J. Kappos
*Director of the United States Patent and Trademark Office*